United States Patent Office 3,526,331
Patented Sept. 1, 1970

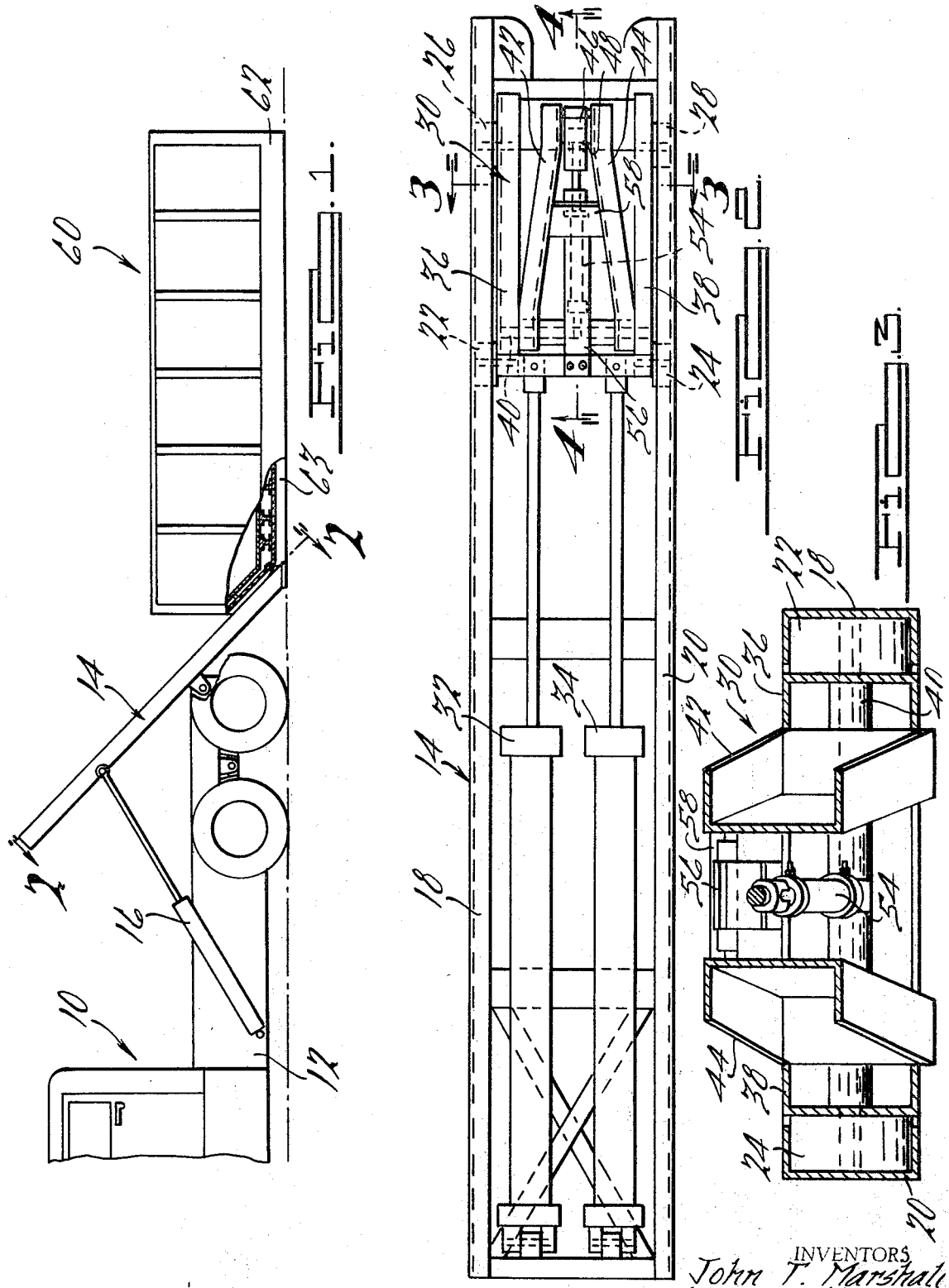

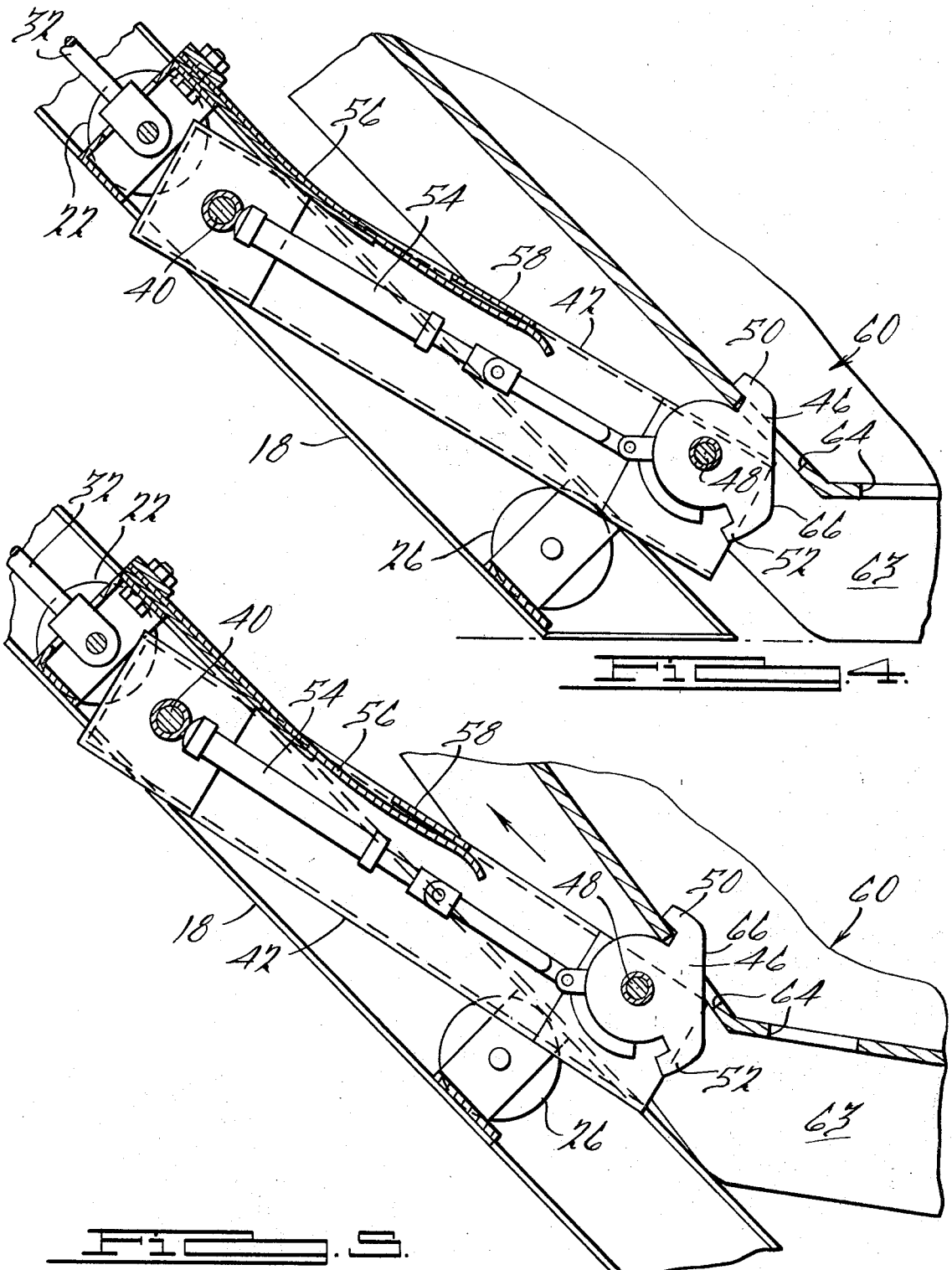

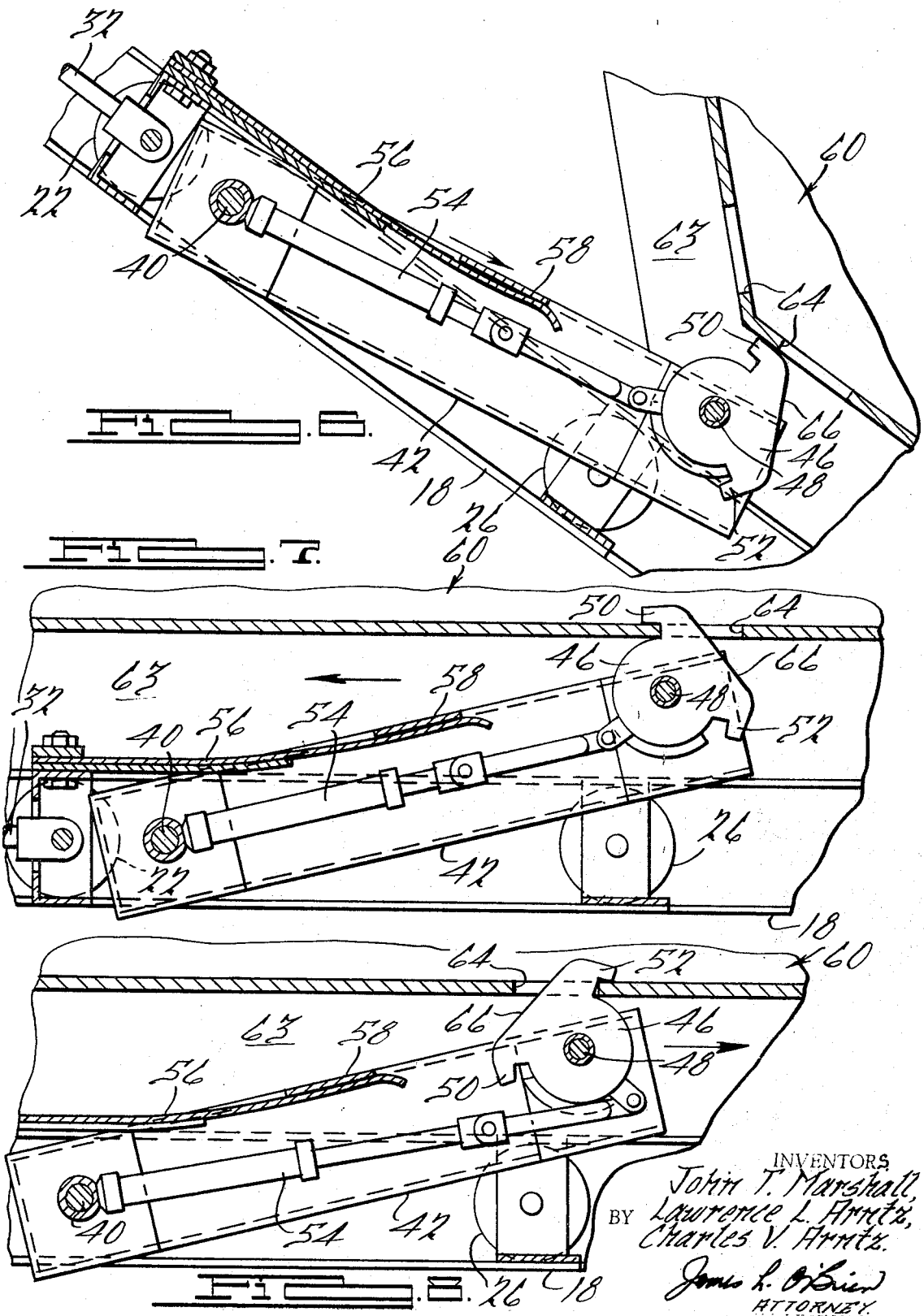

3,526,331
VEHICLE LOADING AND UNLOADING APPARATUS
John T. Marshall, 2484 Worcester Road, Orchard Lake, Mich. 48033; Lawrence L. Arntz, 5100 Drayton Road, and Charles V. Arntz, 8040 Reese Road, both of Clarkston, Mich. 48016
Filed May 28, 1968, Ser. No. 732,569
Int. Cl. B60p 1/64
U.S. Cl. 214—505                     3 Claims

ABSTRACT OF THE DISCLOSURE

A tiltable truck platform having a longitudinally movable carriage carrying a rotatable hook to pick up or unload demountable containers.

---

The present invention relates to truck carried loading and unloading apparatus and more particularly to improvements for loading and unloading demountable containers. Containers of this type may be demounted from the truck or vehicle and left to be filled over a period of time. Filled containers are then picked up and an empty container left behind. The general type of apparatus to which this invention pertains is shown in U.S. Pat. No. 3,144,149 wherein the bottom of the container is provided with a plurality of oppositely opening hooks with a depending rotatable shuttle mounted therebetween which controls the entry of a truck mounted bail into the desired hook. Another approach is shown in U.S. Pat. No. 3,138,276 wherein a slidable shuttle bar is mounted on the container to control entry of a truck mounted bail into the desired hook opening.

The apparatus of the present invention is adapted to work with containers which have no moving parts. A rotatable hook member is adapted to successively engage the edges of slots formed in the bottom of the container or to engage cross bars secured to the bottom of the container to move the container. The hook member is rotatable to move the container in either the loading or unloading direction.

The present invention eliminates the need for movable parts on or under the load container which not only results in a simpler, less costly container, but also provides for increased reliability by eliminating those parts which often fail to operate because of dirt and corrosion. All of the moving parts of the present invention are mounted on the vehicle where they are readily available for maintenance.

Other advantages of the invention will become apparent from the following detailed description taken in connection with the appended drawings in which:

FIG. 1 is a fragmentary side view showing a demountable container and vehicle with the loading and unloading apparatus of the present invention, FIG. 2 is a view taken along line 2—2 of FIG. 1, FIG. 3 is a sectional view taken along line 3—3 of FIG. 2, FIG. 4 is an enlarged sectional view taken along line 4—4 of FIG. 2, FIGS. 5, 6, 7 and 8 are views similar to FIG. 4 showing different position of parts, FIGS. 9 through 15 are views showing a loading sequence, and FIG. 16 is a fragmentary sectional view showing another embodiment of the invention.

Figure 9:
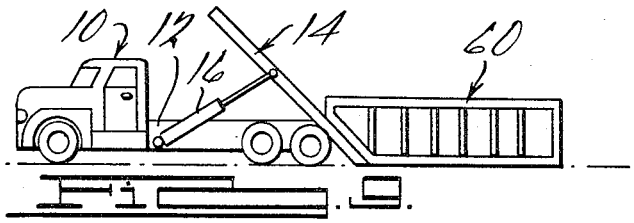
Figure 10:
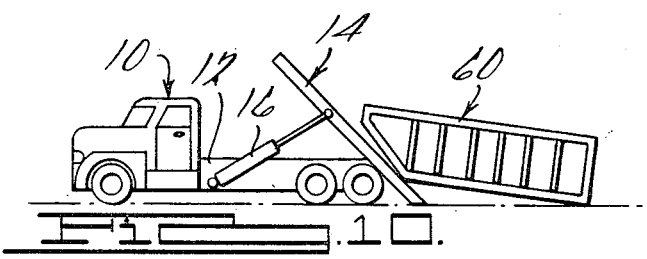
Figure 11:
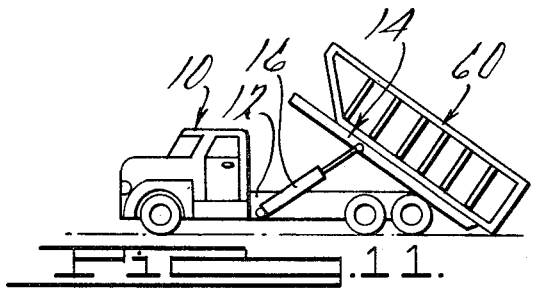
Figure 12:
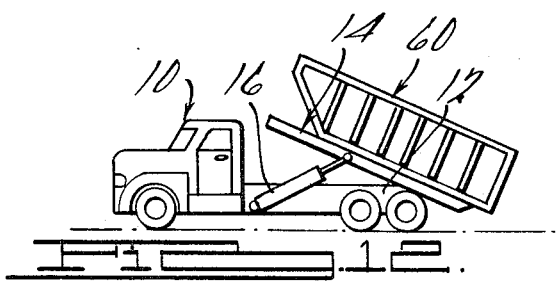
Figure 15:
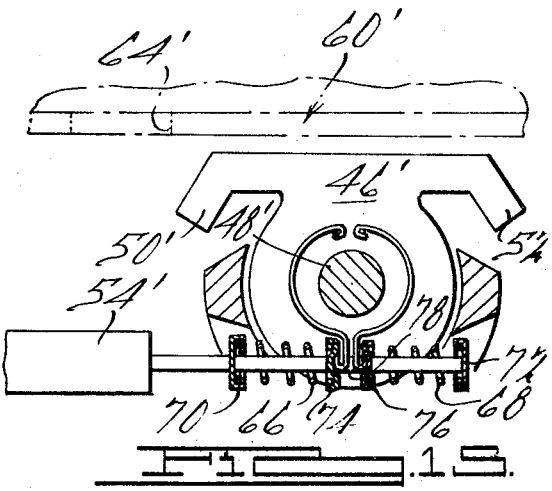
Figure 13:
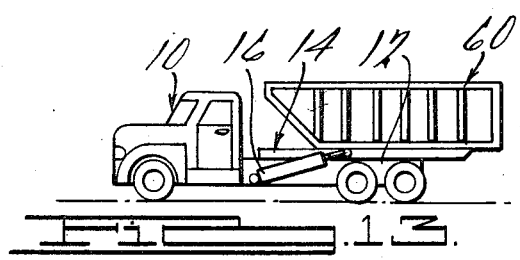
Figure 14:
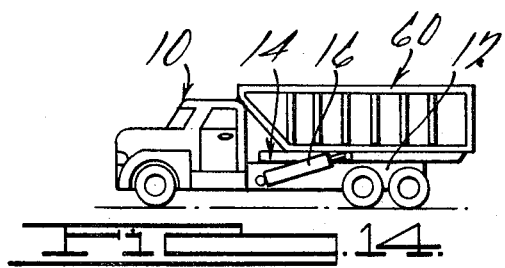

Referring now to the drawings and more particularly to FIG. 1, numeral 10 designates a truck or vehicle having a chassis 12 with a platform 14 pivotally mounted thereon. Actuating means such as a pair of hydraulically actuated members, only one of which is shown and is designated by the numeral 16, are mounted on chassis 12 for selectively rotating platform 14 between a predetermined raised position, as shown in FIGS. 1, 9 and 10, and a predetermined lowered position, as shown in FIGS. 7, 8, 14 and 15. Platform 14 is provided with a pair of transversely spaced longitudinal rail members 18 and 20 to receive rollers 22, 24, 26 and 28 of carriage 30 which is longitudinally movable relative to the platform by means of a pair of hydraulic cylinders or actuating means 32 and 34.

Carriage 30 is provided with side members 36 and 38 spanned by a transverse axle 40 on which are mounted a pair of arms 42 and 44 and which at one end carry a member 46 rotatably mounted on a shaft 48. Rotatable member 46 is formed with oppositely opening first and second hook members designated 50 and 52, respectively. A hydraulic actuating member 54 mounted on carriage 30 selectively rotates member 46 between first and second opposite predetermined positions as exemplified in FIGS. 7 and 8. A spring 56 mounted on platform 14 engages a cross member 58 connecting arms 42 and 44 to urge the arms upwardly out of the plane of the platform.

The demountable container 60 is provided with a pair of transversely spaced longitudinal skids 62 and 63 and a plurality of longitudinally spaced slots or hook engagable members 64 intermediate the skids, the latter being adapted to receive hook members 50 and 52.

As seen in FIG. 1, the loading operation starts with the pivoting of platform 14 to bring the lower part of it into engagement with the ground in front of the load container 60. Carriage 30 is moved to the lower end of platform 14 and then the member 46 rotated to present hook member 50 for engagement with the initial slot or hook engageable member 64. The actuating means 32, 34 is then operated to pull the carriage 30 up the platform, as shown in the transition from FIG. 4 to FIG. 5. After an initial pull, the actuating means 32, 34 is reversed thereby moving the cammed surface 66 of member 46 into engagement with the rear of the first slot 64 thus urging the arms 42, 44 downwardly to disengage hook member 50 from the first slot 64. Continued movement of the actuating means 32, 34 brings hook member 42 into engagement with a subsequent slot 64. At this point the actuating members 32, 34 are again reversed to pull the container a predetermined distance onto the platform 14. As the load container is moved onto the platform 14, the actuating means 16 is operated to lower the platform, the complete loading sequence being shown in FIGS. 9 through 15.

To unload the container the rotatable member 46 is positioned as shown in FIG. 8 to bring hook member 52 into engagement with a slot 64 and the actuating means 32, 34 operated to push the container off the platform 14. The actuating means 16 is operated to raise the platform during the unloading operation.

As shown in FIG. 16, wherein similar parts are indicated by similar members primed, actuating member 54' carries opposed springs 66 and 68 which respectively abut fixed retainers 70 and 72 and movable retainers 74 and 76. An ear 78 formed on member 46' is oppositely engaged by retainers 74 and 76 whereby operation of actuating means 54' resiliently urges member 46' to selectively position hook members 50' and 52' in slots 64'. In this embodiment the spring 56 may be eliminated and the member 46' may be mounted on shaft 48' secured to the side rails of the carriage.

Although our invention has been described in terms of specific embodiments it will be readily apparent to one skilled in the art that various changes and modifications may be made without departing from the spirit of the invention.

We claim:
1. A vehicle loading and unloading apparatus comprising:

A vehicle chassis, a demountable load container having transversely spaced longitudinal skids and a plurality of longitudinally spaced hook engageable members intermediate set skids, a platform pivotally mounted on said chassis for rotation between a predetermined lowered position, first actuating means for selectively rotating said platform, transversely spaced longitudinal rail members formed on said platform, a carriage mounted for movement along said rail members relative to said platform, second actuating means for moving said carriage, bifurcated arm means rotatably mounted on said carriage a transverse shaft mounted on said arm means, a rotatable member, rotatably mounted on said shaft and formed with oppositely opening first and second hook members, and a third actuating member for rotating said rotatable member about said transverse shaft between first and second opposite predetermined limit positions to respectively position said first and second hook members to engage said hook engageable members.

2. The apparatus of claim 1 wherein the rotatable member is formed with a cammed surface adapted to engage said hook engageable members when said carriage is moved in a direction to disengage said hook members from said hook engagable members and resilient means urging said arm means in a direction out of the plane of said platform.

3. The apparatus of claim 1 wherein resilient means is interposed between and connects said third actuating member to said rotatable member whereby said third actuating member yieldably urges said rotatable member between first and second opposite predetermined limit positions to respectively position said first and second hook members to engage said hook engageable members.

References Cited
UNITED STATES PATENTS

| | | |
|---|---|---|
| 1,877,193 | 9/1932 | Norton. |
| 3,219,218 | 11/1965 | Hand _____ 214—516 |
| 3,272,546 | 9/1966 | Cooley _____ 214—516 XR |

ALBERT J. MAKAY, Primary Examiner

U.S. Cl. X.R.
214—516